(12) United States Patent
Xu (10) Patent No.: US 11,414,999 B2
(45) Date of Patent: Aug. 16, 2022

(54) COOLING HOLE WITH SHAPED METER

(71) Applicant: United Technologies Corporation, Farmington, CT (US)

(72) Inventor: JinQuan Xu, East Greenwich, RI (US)

(73) Assignee: Raytheon Technologies Corporation, Farmington, CT (US)

(*) Notice: Subject to any disclaimer, the term of this patent is extended or adjusted under 35 U.S.C. 154(b) by 38 days.

(21) Appl. No.: 16/659,876

(22) Filed: Oct. 22, 2019

(65) Prior Publication Data

US 2020/0063573 A1    Feb. 27, 2020

Related U.S. Application Data

(63) Continuation of application No. 15/207,472, filed on Jul. 11, 2016, now Pat. No. 10,605,092.

(51) Int. Cl.
    *F01D 5/18*      (2006.01)
    *F23R 3/06*      (2006.01)
    (Continued)

(52) U.S. Cl.
    CPC .............. *F01D 5/186* (2013.01); *F01D 9/023* (2013.01); *F01D 9/041* (2013.01); *F01D 9/065* (2013.01); *F01D 11/08* (2013.01); *F01D 25/12* (2013.01); *F01D 25/24* (2013.01); *F02K 1/822* (2013.01); *F04D 29/324* (2013.01);
    (Continued)

(58) Field of Classification Search
    CPC .......... F01D 5/186; F01D 9/023; F01D 9/041; F01D 25/12; F02K 1/822; F04D 29/582; F05D 2240/11; F05D 2240/81; F05D 2260/202; F23R 3/002; F23R 3/04; F23R 3/06; F23R 2900/03041; F23R 2900/03042
    See application file for complete search history.

(56) References Cited

U.S. PATENT DOCUMENTS

| 4,197,443 A | 4/1980 | Sidenstick |
|---|---|---|
| 4,328,580 A | 5/1982 | Stockham, Jr. et al. |

(Continued)

FOREIGN PATENT DOCUMENTS

| EP | 1326007 A2 | 7/2003 |
|---|---|---|
| EP | 1609949 A1 | 12/2005 |

(Continued)

OTHER PUBLICATIONS

Jack D. Mattingly, "Elements of Gas Turbine Propulsion," 1996, pp. GE-1014.001-GE-1014.129, McGrawhill, Inc., United States.

(Continued)

*Primary Examiner* — Scott J Walthour
(74) *Attorney, Agent, or Firm* — Kinney & Lange, P. A.

(57) ABSTRACT

A gas turbine engine component having a cooling passage includes a first wall defining an inlet of the cooling passage, a second wall generally opposite the first wall and defining an outlet of the cooling passage, a metering section extending downstream from the inlet, and a diffusing section extending from the metering section to the outlet. The metering section includes an upstream side and a downstream side generally opposite the upstream side. At least one of the upstream and downstream sides includes a first passage wall and a second passage wall where the first and second passage walls intersect to form a V-shape.

10 Claims, 7 Drawing Sheets

(51) Int. Cl.

| | | |
|---|---|---|
| *F01D 9/02* | (2006.01) | |
| *F02K 1/82* | (2006.01) | |
| *F01D 11/08* | (2006.01) | |
| *F01D 9/06* | (2006.01) | |
| *F01D 9/04* | (2006.01) | |
| *F01D 25/12* | (2006.01) | |
| *F01D 25/24* | (2006.01) | |
| *F04D 29/32* | (2006.01) | |
| *F04D 29/52* | (2006.01) | |
| *F04D 29/54* | (2006.01) | |
| *F04D 29/58* | (2006.01) | |
| *F23R 3/00* | (2006.01) | |
| *F23R 3/04* | (2006.01) | |

(52) U.S. Cl.
CPC ......... *F04D 29/522* (2013.01); *F04D 29/542* (2013.01); *F04D 29/545* (2013.01); *F04D 29/582* (2013.01); *F23R 3/002* (2013.01); *F23R 3/04* (2013.01); *F23R 3/06* (2013.01); *F05D 2220/32* (2013.01); *F05D 2240/11* (2013.01); *F05D 2240/81* (2013.01); *F05D 2250/11* (2013.01); *F05D 2250/75* (2013.01); *F05D 2260/202* (2013.01); *F05D 2260/2212* (2013.01); *F23R 2900/03041* (2013.01); *F23R 2900/03042* (2013.01); *Y02T 50/60* (2013.01)

(56) References Cited

U.S. PATENT DOCUMENTS

| | | |
|---|---|---|
| 4,529,358 A | 7/1985 | Papell |
| 4,622,821 A | 11/1986 | Madden |
| 4,653,279 A | 3/1987 | Reynolds |
| 4,653,983 A | 3/1987 | Vehr |
| 4,672,727 A | 6/1987 | Field |
| 4,684,323 A | 8/1987 | Field |
| 4,700,544 A | 10/1987 | Fucci |
| 4,738,588 A | 4/1988 | Field |
| 5,062,768 A | 11/1991 | Marriage |
| 5,096,379 A | 3/1992 | Stroud et al. |
| 5,129,231 A | 7/1992 | Becker et al. |
| 5,252,026 A | 10/1993 | Shepherd |
| 5,326,224 A | 7/1994 | Lee et al. |
| 5,358,374 A | 10/1994 | Correia et al. |
| 5,382,133 A | 1/1995 | Moore et al. |
| 5,418,345 A | 5/1995 | Adamski |
| 5,419,681 A | 5/1995 | Lee |
| 5,433,674 A | 7/1995 | Sheridan et al. |
| 5,609,779 A | 3/1997 | Crow et al. |
| 5,651,662 A | 7/1997 | Lee et al. |
| 5,660,525 A | 8/1997 | Lee et al. |
| 5,683,600 A | 11/1997 | Kelley et al. |
| 5,813,836 A | 9/1998 | Starkweather |
| 6,139,258 A | 10/2000 | Lang, III et al. |
| 6,183,199 B1 | 2/2001 | Beeck et al. |
| 6,241,468 B1 | 6/2001 | Lock et al. |
| 6,243,948 B1 | 6/2001 | Lee et al. |
| 6,287,075 B1 | 9/2001 | Kercher |
| 6,307,175 B1 | 10/2001 | Blochlinger et al. |
| 6,494,678 B1 | 12/2002 | Bunker |
| 6,547,524 B2 | 4/2003 | Kohli et al. |
| 6,572,335 B2 | 6/2003 | Kuwabara et al. |
| 6,744,010 B1 | 6/2004 | Pepe et al. |
| 6,944,580 B1 | 9/2005 | Blume et al. |
| 6,973,419 B1 | 12/2005 | Fortin et al. |
| 6,979,176 B2 | 12/2005 | Nakamata et al. |
| 7,186,085 B2 | 3/2007 | Lee |
| 7,273,351 B2 | 9/2007 | Kopmels |
| 7,374,401 B2 | 5/2008 | Lee |
| 7,578,653 B2 | 8/2009 | Klasing et al. |
| 7,726,131 B2 | 6/2010 | Sze et al. |
| 7,766,609 B1 | 8/2010 | Liang |
| 7,887,294 B1 | 2/2011 | Liang |
| 7,997,868 B1 | 8/2011 | Liang |
| 8,038,399 B1 | 10/2011 | Liang |
| 8,057,181 B1 | 11/2011 | Liang |
| 8,245,519 B1 | 8/2012 | Liang |
| 2001/0036401 A1 | 11/2001 | Harvey et al. |
| 2002/0159888 A1 | 10/2002 | Rinck et al. |
| 2005/0106020 A1 | 5/2005 | Bunker et al. |
| 2005/0286998 A1 | 12/2005 | Lee et al. |
| 2008/0003096 A1 | 1/2008 | Kohli et al. |
| 2008/0145208 A1 | 6/2008 | Klasing et al. |
| 2008/0286090 A1 | 11/2008 | Okita |
| 2009/0013695 A1 | 1/2009 | Dierberger et al. |
| 2009/0074588 A1 | 3/2009 | Scott |
| 2009/0304499 A1 | 12/2009 | Strock et al. |
| 2010/0068032 A1 | 3/2010 | Liang |
| 2010/0282721 A1 | 11/2010 | Bunker et al. |
| 2011/0097191 A1 | 4/2011 | Bunker |
| 2011/0123312 A1 | 5/2011 | Venkataramanan et al. |
| 2011/0132876 A1 | 6/2011 | Pietraszkiewicz et al. |
| 2011/0185572 A1 | 8/2011 | Wei et al. |
| 2011/0293423 A1 | 12/2011 | Bunker et al. |
| 2011/0311369 A1 | 12/2011 | Ramachandran et al. |
| 2012/0051941 A1 | 3/2012 | Bunker |
| 2012/0167389 A1 | 7/2012 | Lacy et al. |
| 2013/0028713 A1 | 1/2013 | Giri et al. |
| 2013/0205791 A1 | 8/2013 | Mongillo, Jr. et al. |
| 2013/0209228 A1* | 8/2013 | Xu ............... F01D 9/065 415/115 |
| 2013/0209235 A1 | 8/2013 | Xu |
| 2014/0294598 A1 | 10/2014 | Nita et al. |

FOREIGN PATENT DOCUMENTS

| | | | |
|---|---|---|---|
| EP | 2666964 A2 | 11/2013 | |
| GB | 716105 | 9/1954 | |
| GB | 1363151 | 8/1974 | |
| JP | 2001012204 A | 1/2001 | |
| WO | WO-2008059620 A1 * | 5/2008 | ............ F01D 5/186 |
| WO | WO2013122913 A1 | 8/2013 | |
| WO | WO2013123012 A1 | 8/2013 | |

OTHER PUBLICATIONS

Je-Chin Han et al., "Gas Turbine Heat Transfer and Cooling Technology," 2000, pp. GE-1008.001-GE-1008.159, Taylor & Francis, New York.

Ronald S. Bunker, "A Review of Shaped Hole Turbine Film-Cooling Technology," Journal of Heat Transfer, Apr. 2005, vol. 127, pp. GE-1010.0001-GE 1010.013.

Kusterer, K. et al., "The Nekomimi Cooling Technology: Cooling Holes with Ears for High-Efficient Film Cooling," Proceedings of ASME Turbo Expo 2011, Jun. 6-10, 2011, 11 Pages.

John Eaton, Ph.D., In the United States and Trademark Office before the Patent Trial and Appeal Board, Declaration of John Eaton PH.D., Jul. 9, 2012, pp. GE-1003.001-GE1003.087, United States.

Extended European Search Report for EP Application No. 17180374.5, dated Nov. 23, 2017, pp. 9.

* cited by examiner

COOLING HOLE WITH SHAPED METER

CROSS-REFERENCE TO RELATED APPLICATION(S)

This application is a continuation of U.S. application Ser. No. 15/207,472 filed Jul. 11, 2016 for "COOLING HOLE WITH SHAPED METER" by J. Xu.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, blade outer air seals (shrouds) and compressor and turbine casings, combustor liners, turbine exhaust assemblies, thrust augmentors and exhaust nozzles.

Gas turbine engines are rotary-type combustion turbine engines built around a power core made up of one or more compressor sections, a combustor, and one or more turbine sections arranged in flow series with an upstream inlet and downstream exhaust. The compressor section(s) compress(es) air from the inlet, which is mixed with fuel in the combustor and ignited to generate hot combustion gas. The turbine section(s) extract(s) energy from the expanding combustion gas, and drive(s) the compressor section(s) via a common shaft. Expanded combustion products are exhausted downstream, and energy is delivered in the form of rotational energy from the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains, and armored vehicles, and in smaller-scale applications such as auxiliary power units.

Aviation applications include turbojet, turbofan, turboprop and turboshaft engine designs. In turbojet engines, thrust is generated primarily from exhaust. Modern fixed-wing aircraft generally employ turbofan and turboprop configurations, in which a low-pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines are employed in a variety of single-rotor and contra-rotating designs with both forward- and aft-mounting configurations.

Aviation turbines generally utilize two- or three-spool configurations, with a corresponding number of coaxially rotating turbine and compressor sections. In two-spool designs, the high-pressure turbine drives a high-pressure compressor, together forming the high-pressure spool or high spool. The low-pressure turbine drives the low spool and fan section, or a shaft for a rotor or propeller. In three-spool engines, there is also an intermediate-pressure spool. Aviation turbines are also used to power auxiliary devices including electrical generators, hydraulic pumps and elements of the environmental control system, for example using bleed air from a compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines with a variety of spool configurations and traditional or variable cycle modes of operation are also used.

Turbofan engines are commonly divided into high- and low-bypass configurations. High-bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low-bypass turbofans produce proportionally more thrust from the exhaust flow, generating greater specific thrust for use in high-performance applications including supersonic jet aircraft. Low-bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

A gas turbine engine component with a cooling passage includes a first wall defining an inlet of the cooling passage, a second wall generally opposite the first wall and defining an outlet of the cooling passage, a metering section extending downstream from the inlet and a diffusing section extending from the metering section to the outlet. The metering section includes an upstream side and a downstream side generally opposite the upstream side. At least one of the upstream and downstream sides includes a first passage wall and a second passage wall and the first and second passage walls intersect to form a V-shape.

A wall located in a gas turbine engine includes first and second surfaces and a cooling passage extending between an inlet at the first surface and an outlet at the second surface. The cooling passage includes a metering section commencing at the inlet and a diffusing section in communication with the metering section and terminating at the outlet. The metering section includes a longitudinal first side and a longitudinal second side generally opposite the first side. The first side includes a first passage wall and a second passage wall and the first and second passage walls intersect to form a vertex.

DETAILED DESCRIPTION

The present disclosure describes cooling passages with shaped metering sections. The shaped metering sections described herein counteract the kidney vortices formed by conventional (e.g., round or oval) metering shapes. Counteracting the formation of kidney vortices allows better distribution of the cooling fluid flow through the cooling passage's diffusing section, which is located downstream of the metering section. This results in an overall improvement of film cooling effectiveness.

Figure 1:
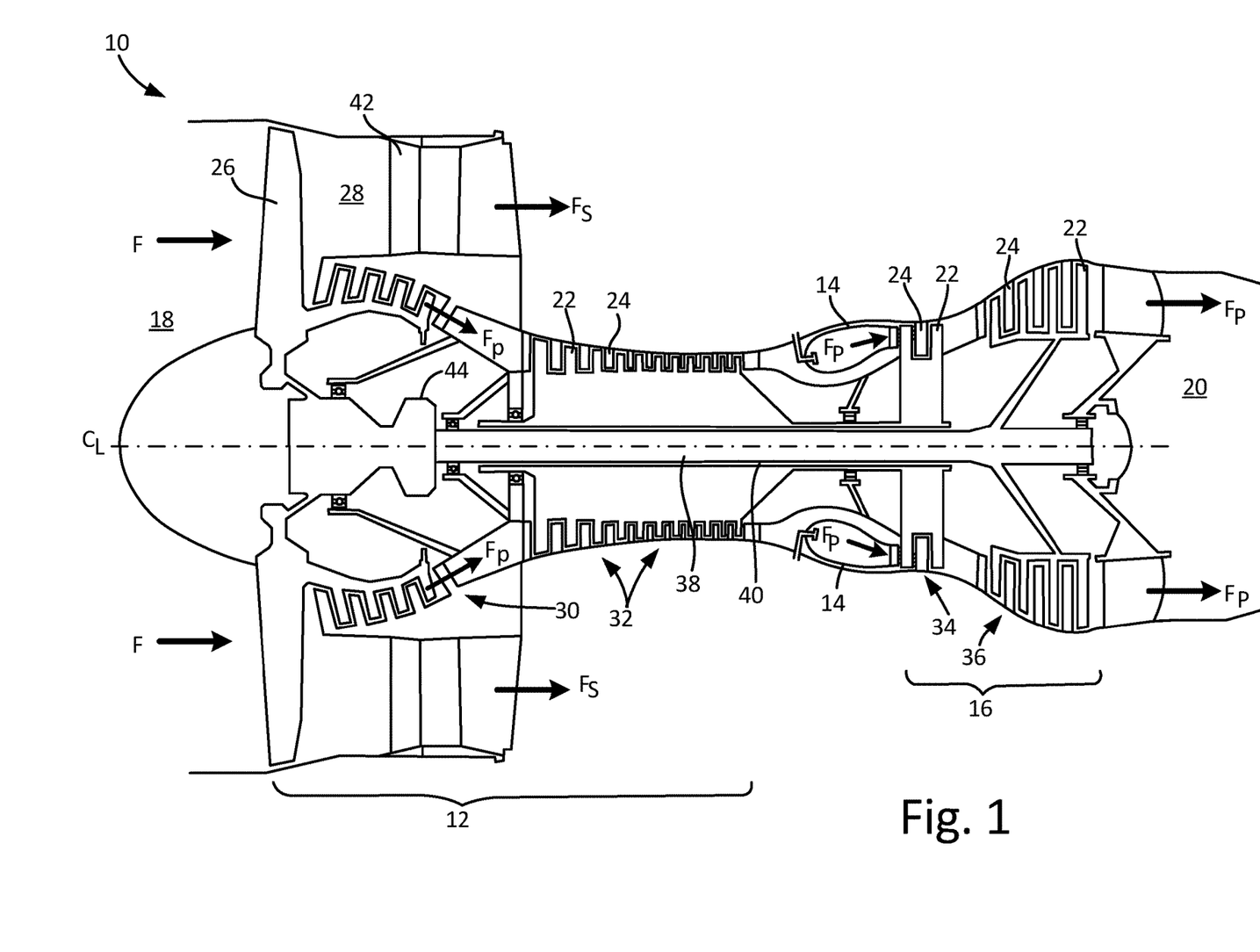
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 can also be used, with turbine engine 10 operating as a turboprop or unducted turbofan engine. Alternatively, fan rotor 26 and bypass duct 28 can be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow including, but not limited to, platforms, shrouds, casings and other endwall surfaces in hot sections of compressor 12 and turbine 16, and liners, nozzles, afterburners, augmentors and other components in combustor 14 and exhaust section 20.

In the two-spool, high-bypass configuration of FIG. 1, compressor section 12 includes low-pressure compressor (LPC) 30 and high-pressure compressor (HPC) 32, and turbine section 16 includes high-pressure turbine (HPT) 34 and low-pressure turbine (LPT) 36. Low-pressure compressor 30 is rotationally coupled to low-pressure turbine 36 via low pressure (LP) shaft 38, forming the LP spool or low spool. High-pressure compressor 32 is rotationally coupled to high-pressure turbine 34 via high-pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low-pressure compressor 30 and high-pressure compressor 32, then mixed with fuel in combustor 14 and ignited to generate hot combustion gas. The combustion gas expands to provide rotational energy in high-pressure turbine 34 and low-pressure turbine 36, which drive high-pressure compressor 32 and low-pressure compressor 30, respectively. Expanded combustion gases exit through exhaust section (or exhaust nozzle) 20, which can be shaped or actuated to regulate the exhaust flow and improve thrust performance.

Low-pressure shaft 38 and high-pressure shaft 40 are mounted coaxially about centerline $C_L$, and rotate at different speeds. Fan rotor (or other propulsion stage) 26 is rotationally coupled to low-pressure shaft 38. In advanced designs, fan drive gear system 44 is provided for additional fan speed control, improving thrust performance and efficiency with reduced noise output.

Fan rotor 26 can also function as a first-stage compressor for gas turbine engine 10, and LPC 30 can be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high-pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
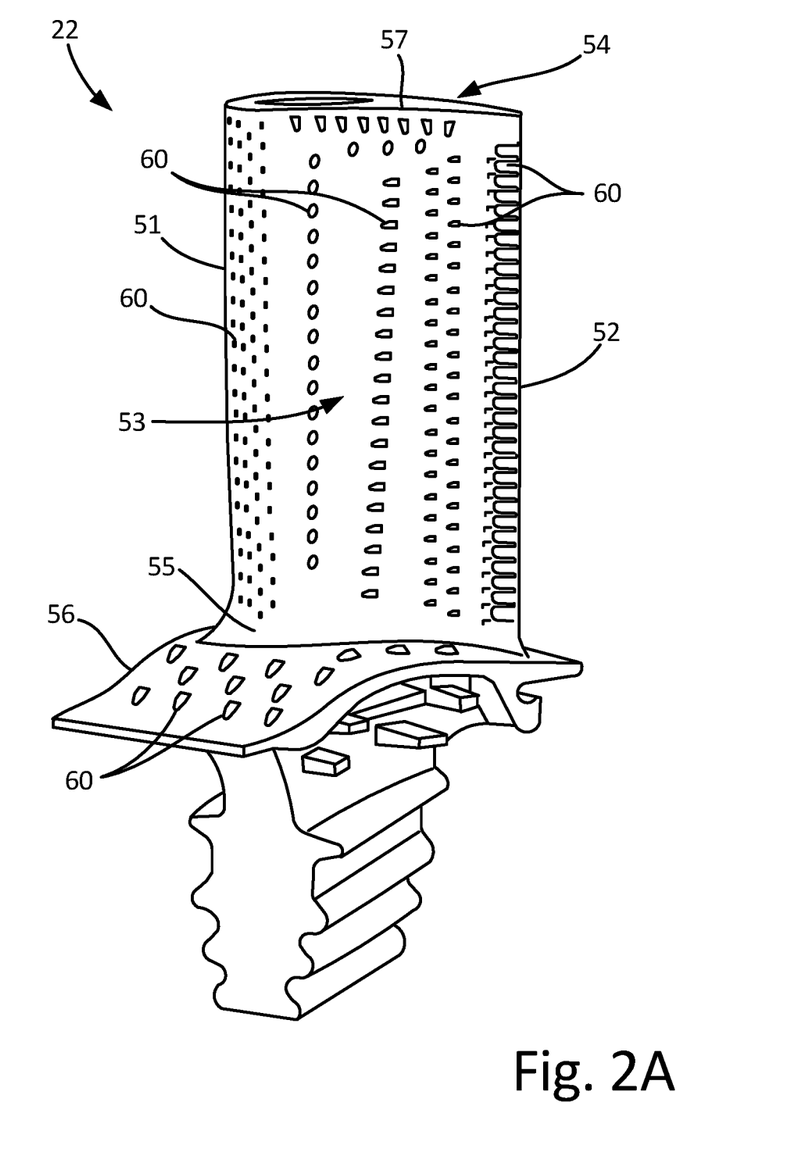
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling passages 60 are provided on one or more surfaces of airfoil 22, for example along leading edge 51, trailing edge 52, pressure (or generally concave) surface 53, or suction (or generally convex) surface 54, or a combination thereof. Cooling passages 60 can also be provided on the endwall surfaces of airfoil 22, for example along ID platform 56, or on a shroud or engine casing adjacent tip section 57.

Figure 2B:
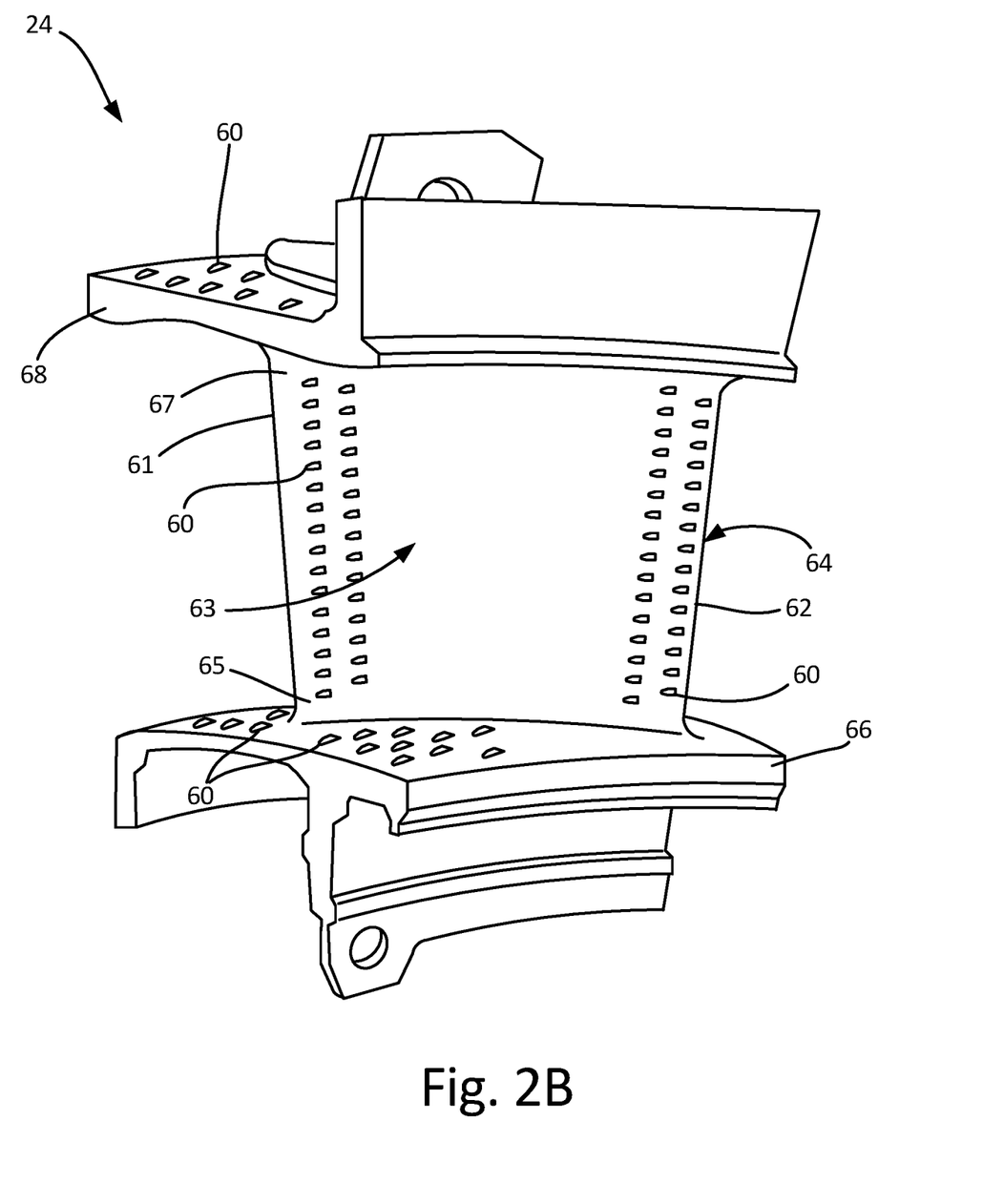
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling passages 60 are provided along one or more surfaces of airfoil 24, for example leading or trailing edge 61 or 62, pressure (concave) or suction (convex) surface 63 or 64, or a combination thereof. Cooling passages 60 can also be provided on the endwall surfaces of airfoil 24, for example along ID platform 66 and OD platform 68.

Rotor airfoils 22 (FIG. 2A) and stator airfoils 24 (FIG. 2B) are formed of high strength, heat-resistant materials such as high-temperature alloys and superalloys, and are provided with thermal and erosion-resistant coatings. Airfoils 22 and 24 are also provided with internal cooling passageways and cooling passages 60 to reduce thermal fatigue and wear, and to prevent melting when exposed to hot gas flow in the higher temperature regions of a gas turbine engine or other turbomachine. Cooling passages 60 deliver cooling fluid (e.g., steam or air from a compressor) through the outer walls and platform structures of airfoils 22 and 24, creating a thin layer (or film) of cooling fluid to protect the outer (gas path) surfaces from high-temperature flow.

While surface cooling extends service life and increases reliability, injecting cooling fluid into the gas path also reduces engine efficiency, and the cost in efficiency increases with increased cooling flow. Cooling passages 60 are thus provided with improved metering and inlet geometry to reduce jets and blow off, and improved diffusion and exit geometry to reduce flow separation and corner effects. Cooling passages 60 reduce flow requirements and improve the spread of cooling fluid across the hot outer surfaces of airfoils 22 and 24, and other gas turbine engine components, so that less flow is needed for cooling and efficiency is maintained or increased.

The cooling passages described herein provide a cooling solution that offers improved film cooling and eliminates or reduces the flow separation problems associated with conventional diffusion-type film cooling passages. The shape of the cooling passage metering section is modified to better direct cooling air to the passage's diffusing section and form a uniform cooling film downstream from the cooling passage. The described cooling passages provide improved film effectiveness and reduce the likelihood of film separation so that they work as intended at high blowing ratios.

Some cooling passages include two sections: (1) a metering section at or near the passage inlet and (2) a diffusing section at or near the passage outlet. The metering section "meters" the flow of cooling air, regulating the velocity and quantity of air that enters through the inlet. Air flowing through the metering section enters the diffusing section before reaching the outlet. The diffusing section causes the cooling air to expand (diffuse) so that a wider cooling film is formed. A recent trend in state of the art cooling passages has been to modify the cooling film by changing the geometry or configuration of the diffusing section of cooling passages. While this technique has yielded some improvements in film cooling, it also presents additional difficulties. For example, some cooling passages with multi-lobed diffusing sections can diffuse the cooling air too much at high blowing ratios, spreading the cooling film too thinly so that "holes" or "gaps" in the cooling film appear. This phenomenon is called flow separation. Fluid in the hot gas path adjacent to the cooling passage can mix into these holes or gaps in the cooling film, transferring unwanted heat to the film cooled component and reducing cooling effectiveness. Additionally, although film cooling performance typically improves as the blowing ratio is increased, the expansion ratio of the diffuser can be too great, resulting in flow separation and incomplete filling of the diffuser section of the cooling passage with cooling air. In these circumstances, high temperature gases passing along wall surfaces can mix with the cooling air flowing within the diffuser section of the cooling passage (i.e. hot gas entrainment). The turbulent mixing that occurs during hot gas entrainment can adversely impact film cooling effectiveness and performance of the diffusing section of the cooling passage. Instead of modifying the diffusing section of the cooling passage to reduce the incidence of flow separation and potential entrainment of hot gas path flow (high temperature gases), which adversely impacts overall cooling performance, geometric features are introduced that reduce the propensity of flow separation with highly diffused cooling passage geometries, while also mitigating the amount of turbulent mixing that occurs between the expelled film cooling flow and the free stream gas within the thermal boundary layer. The cooling passages described herein contain modified metering section geometry to improve the overall film cooling performance by improving diffusing section fill characteristics while also reducing the amount of downstream film attenuation.

Figure 3:
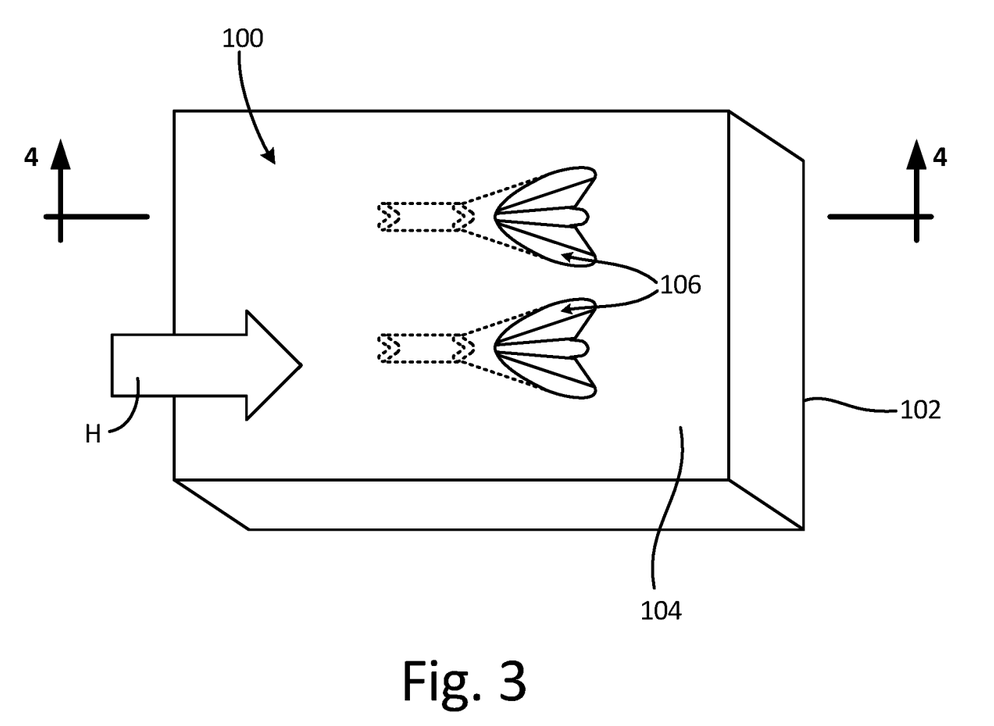
FIG. 3 is a top view of a wall having cooling passages with shaped metering sections.

FIG. 3 illustrates a view of a portion of a wall of a gas turbine engine component having cooling passages. Wall 100 includes inner wall surface 102 and outer wall surface 104. As described in greater detail below, wall 100 is primarily metallic and outer wall surface 104 can include a thermal barrier coating. Cooling passages 106 are oriented so that their inlets are positioned on the first wall surface 102 and their outlets are positioned on outer wall surface 104. During gas turbine engine operation, outer wall surface 104 is in proximity to high temperature gases (e.g., combustion gases, hot air). Cooling air is delivered inside wall 100 where it exits the interior of the component through cooling passages 106 and forms a cooling film on outer wall surface 104. The diffusing section of cooling passage 106 can have multiple lobes to aid in the lateral diffusion of the cooling air as shown in FIG. 3. In this embodiment, cooling passages 106 have three lobes in the diffusing section.

As described in greater detail below, cooling air enters the metering section of cooling passage 106 and flows out of the diffusing section of cooling passage 106. Cooling passages 106 can be arranged in a row on wall 100 as shown in FIG. 3 and positioned axially so that the cooling air flows in substantially the same direction longitudinally as the high temperature gases flowing past wall 100. In this embodiment, cooling air passing through cooling passages 106 exits cooling holes traveling in substantially the same direction as the high temperature gases flowing along outer wall surface 104 (represented by arrow H). Here, the linear row of cooling passages 106 is substantially perpendicular to the direction of flow H. In alternate embodiments, the orientation of cooling passages 16 can be arranged on outer wall surface 104 so that the flow of cooling air is substantially perpendicular to the high temperature gas flow (i.e. cooling air exits cooling passages 106 radially) or at an angle between parallel and perpendicular (compound angle). Cooling passages 106 can also be provided in a staggered formation on wall 100. Cooling passages 106 can be located on a variety of components that require cooling. Suitable components include, but are not limited to, turbine vanes and blades, blade or vane platforms, shrouds, endwalls, combustors, blade outer air seals, augmentors, etc. Cooling passages 106 can be located on the pressure side or suction side of airfoils. Cooling passages 106 can also be located on the blade tip.

Figure 4:
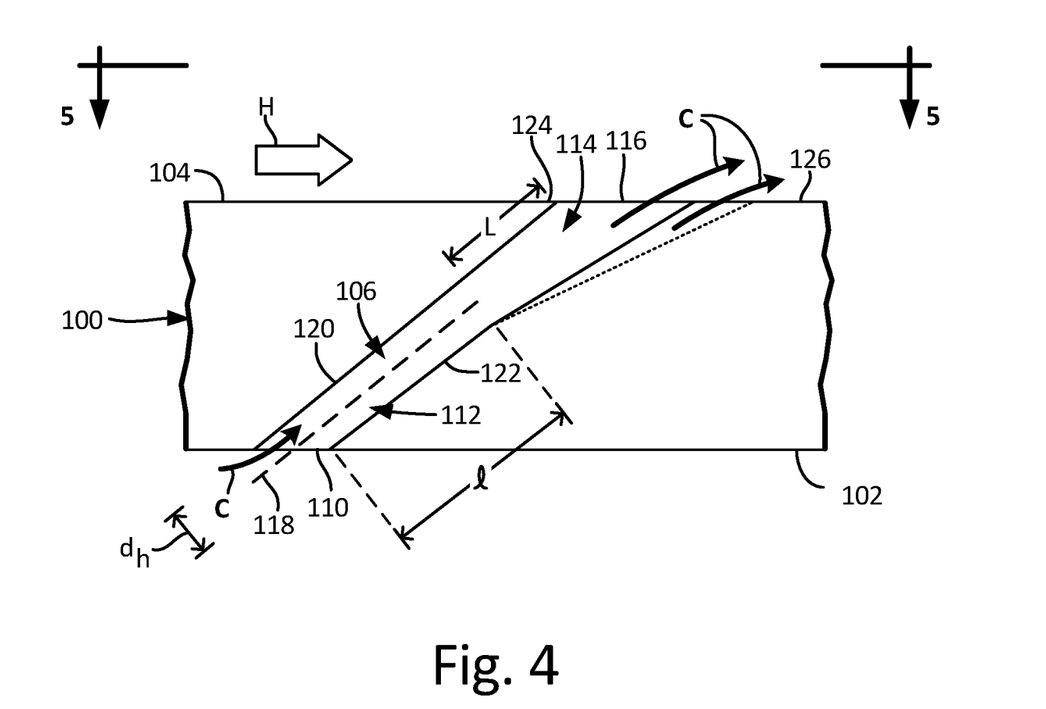
FIG. 4 is a section view of the cooling passage of FIG. 3 taken along the line 4-4.

FIG. 4 illustrates a sectional view of film cooling passage 106 of FIG. 3 taken through the center of cooling passage 106 along the line 4-4. Cooling passage 106 includes inlet 110, metering section 112, diffusing section 114 and outlet 116. Inlet 110 is an opening located on inner wall surface 102. Cooling air C enters cooling passage 106 through inlet 110 and passes through metering section 112 and diffusing section 114 before exiting cooling passage 106 at outlet 116 along outer wall surface 104.

Metering section 112 is adjacent to and downstream from inlet 110 and controls (meters) the flow of cooling air through cooling passage 106. In some embodiments, metering section 112 has a substantially constant flow area from inlet 110 to diffusing section 114. Metering sections 112 have a length l and hydraulic diameter $d_h$. Hydraulic diameters ($d_h$) are used to describe flow in non-circular channels. In some embodiments, metering section 112 has a length l according to the relationship: $d_h \leq l \leq 3d_h$. That is, the length of metering section 112 is between one and three times its hydraulic diameter. The length of metering section 112 can exceed $3d_h$, reaching upwards of $30d_h$. In some embodiments, metering section 112 is inclined with respect to wall 100 as illustrated in FIG. 4 (i.e. metering section 112 is not perpendicular to wall 100). Metering section 112 has a longitudinal axis represented by numeral 118. As shown in FIG. 4, metering section 112 is inclined with respect to wall 100 to include upstream side 120 and downstream side 122. Upstream side 120 and downstream side 122 are connected by passage side walls (shown in FIGS. 5A, 5B, and 5C) to form metering section 112.

Figure 5A:
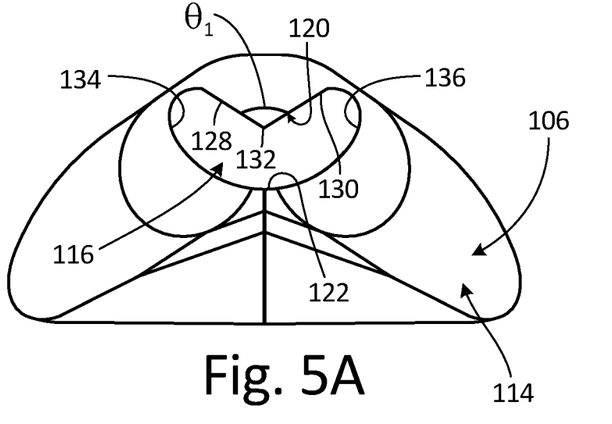
FIG. 5A is a view of one embodiment of a cooling passage taken along the line 5-5 in FIG. 4.
Figure 5B:
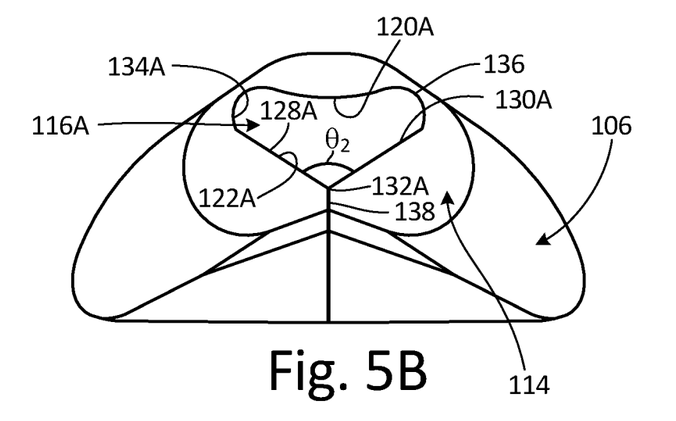
FIG. 5B is a view of another embodiment of a cooling passage taken along the line 5-5 in FIG. 4.
Figure 5C:
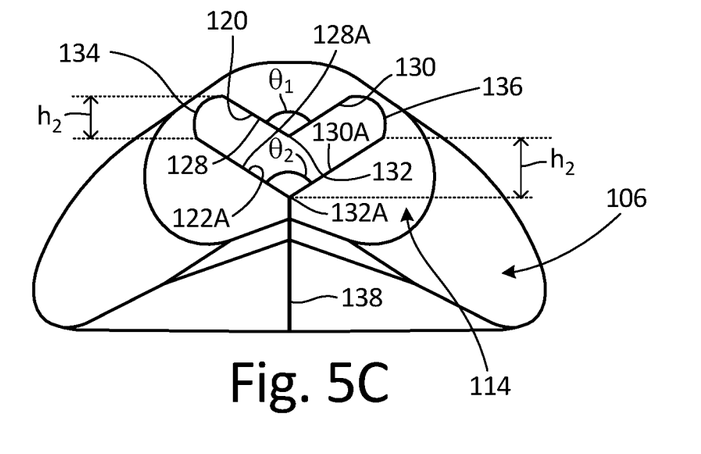
FIG. 5C is a view of another embodiment of a cooling passage taken along the line 5-5 in FIG. 4.

Diffusing section 114 is adjacent to and downstream from metering section 112. Cooling air C diffuses within diffusing section 114 before exiting cooling passage 106 along outer wall surface 104. Outer wall surface 104 includes upstream end 124 (upstream of cooling passage 106) and downstream end 126 (downstream from cooling passage 106). Diffusing section 114 opens along outer wall surface 104 between upstream end 124 and downstream end 126. As shown in FIG. 4, cooling air C diffuses away from longitudinal axis 118 in diffusing section 114 as it flows towards outlet 116. Diffusing section 114 can have various configurations. Diffusing section 114 can have multiple lobes as shown in FIGS. 3, 4, and 5A-5C and described in greater detail in the U.S. Pat. Nos. 8,763,402; 8,683,813; and 8,584,470, each of which are incorporated by reference. For example, FIG. 3 illustrates cooling passage 106 having diffusing section 114 that includes three lobes while FIGS. 5A, 5B, and 5C illustrate cooling passages 106 having diffusing sections 114 that each include two lobes. In other embodiments, diffusing section 114 is a more conventional diffusing section such as those described in U.S. Pat. No. 4,197,443 or 4,684,323.

To improve the flow of cooling air C through cooling passage 106, metering section 112 does not possess the conventional circular, oblong (oval or elliptical) or racetrack (oval with two parallel sides having straight portions) cross-sectional geometries common in some cooling passages. Instead, metering section 112 includes at least one side having two passage walls that generally form a V-shape.

FIGS. 5A, 5B, 5C, and 6 illustrate different embodiments of cooling passage 106 in greater detail; each embodiment has a different shaped metering section. FIGS. 5A, 5B, and 5C show metering section 112 from the perspective of diffusing section 114 (i.e. the viewer is looking straight through metering section 112 towards inlet 110).

In the embodiment shown in FIG. 5A, upstream side 120 of metering section 112 contains two passage walls that form a V-shape. Upstream side 120 includes first passage wall 128 and second passage wall 130. First passage wall 128 and second passage wall 130 intersect at vertex 132 at or near the lateral (left-to-right) center of metering section 112 to form a V-shape. Passage side walls 134 and 136 connect upstream side 120 and downstream side 122. In this embodiment, first passage wall 128 and second passage wall 130 are straight. Angle $\theta_1$ represents the angle between first passage wall 128 and second passage wall 130. In some embodiments, angle $\theta_1$ is greater than 90 degrees. In another embodiment, one of the first and second passage walls is straight; the other passage wall is at least partially curved.

In the embodiment shown in FIG. 5B, downstream side 122A of metering section 112A contains two passage walls that form a V-shape. Downstream side 122A includes first passage wall 128A and second passage wall 130A. First passage wall 128A and second passage wall 130A intersect at vertex 132A at or near the lateral (left-to-right) center of metering section 112A to form a V-shape. Passage side walls 134 and 136 connect upstream side 120A and downstream side 122A. In this embodiment, first passage wall 128A and second passage wall 130A are straight. Angle $\theta_2$ represents the angle between first passage wall 128A and second passage wall 130A. In some embodiments, angle $\theta_2$ is greater than 90 degrees. In another embodiment, one of the first and second passage walls is straight; the other passage wall is at least partially curved.

In the embodiment shown in FIG. 5C, both upstream side 120 and downstream side 122A of metering section 112B each contain two passage walls that form a V-shape. Upstream side 120 includes first passage wall 128 and second passage wall 130. First passage wall 128 and second passage wall 130 intersect at vertex 132 at or near the lateral (left-to-right) center of metering section 112B to form a first V-shape. In this embodiment, first passage wall 128 and second passage wall 130 are straight. Angle $\theta_1$ represents the angle between first passage wall 128 and second passage wall 130. In some embodiments, angle $\theta_1$ is greater than 90 degrees. Downstream side 122A includes third passage wall 128A and fourth passage wall 130A. Third passage wall 128A and fourth passage wall 130A intersect at vertex 132A at or near the lateral (left-to-right) center of metering section 112B to form a second V-shape. In this embodiment, third passage wall 128A and fourth passage wall 130A are straight. Angle $\theta_2$ represents the angle between third passage wall 128A and fourth passage wall 130A. In some embodiments, angle $\theta_2$ is greater than 90 degrees. Passage side walls 134 and 136 connect upstream side 120 and downstream side 122A. As shown in FIG. 5C, metering section 112B has a cross-section with a chevron shape. In some embodiments, angle $\theta_2$ may be equal to, greater than, or less than angle $\theta_1$.

Metering section 112B can be configured so that first passage wall 128 and third passage wall 128A are parallel and so that second passage wall 130 and fourth passage wall 130A are parallel. In these cases, angles $\theta_1$ and $\theta_2$ are equivalent. In other embodiments, such as that shown in FIG. 5C, the above groups of passage walls are not parallel to one another. In these cases, angles $\theta_1$ and $\theta_2$ are not equivalent. In some of the embodiments where angles $\theta_1$ and $\theta_2$ are not equivalent, the height of metering section 112B is greater at its center ($h_1$, measured as the distance from vertex 132 to vertex 132A) than at its ends (e.g., $h_2$, measured as the distance from the outer end of first passage wall 128 to third passage wall 128A in a direction parallel to $h^1$). In other embodiments $h_2$ is greater than $h^1$.

As shown in FIGS. 5A, 5B, and 5C, diffusing section 114 can contain multiple lobes. As noted above, diffusing section 114 can take a number of different shapes, such as those described in U.S. Pat. Nos. 8,763,402; 8,683,813; and 8,584,470. In some instances, diffusing section 114 contains ridge 138 that can extend from metering section 116 through diffusing section 114 to outlet 116. Ridge 138 can intersect with vertex 132A as shown in FIGS. 5B and 5C. Thus, passage walls 128A and 130A intersect not only with each other, but also with ridge 138.

Figure 6:
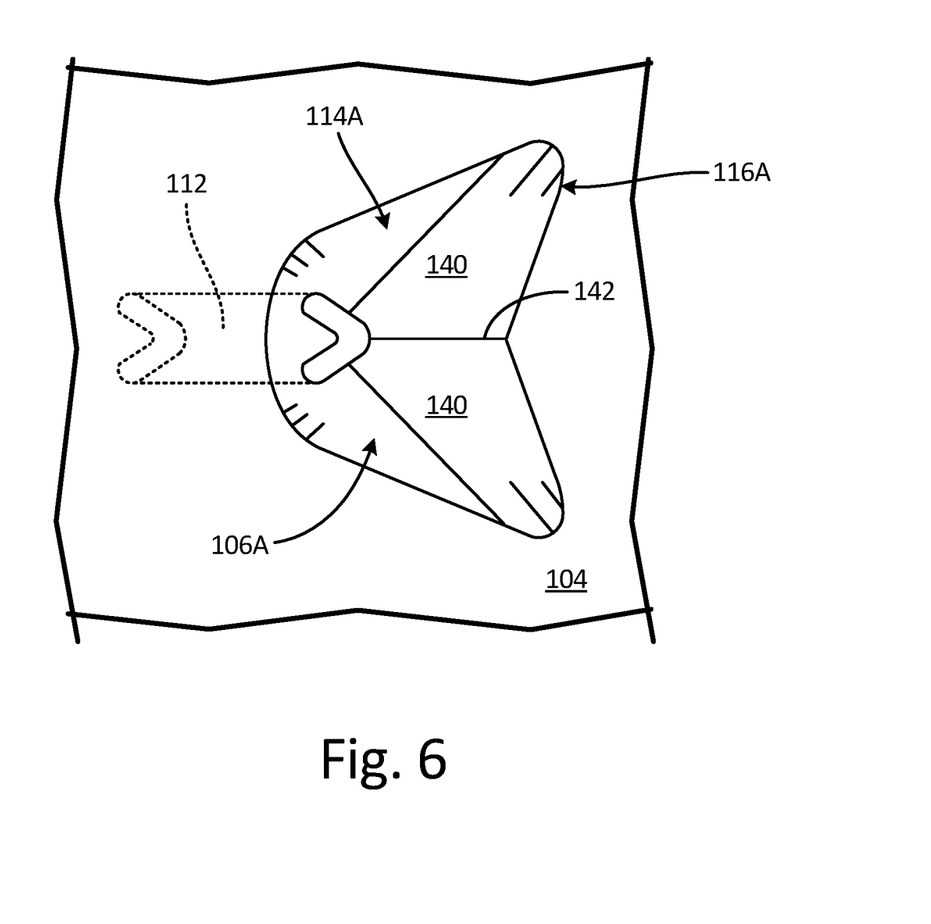
FIG. 6 is a top view of a wall having another embodiment of a cooling passage with a shaped metering section.

FIG. 6 illustrates another embodiment of a cooling passage with a shaped metering section. In this example, cooling passage 106A includes one of the shaped metering sections 112 described herein (e.g., metering section 112, 112A, 112B, etc.). The diffusing section differs from those of FIGS. 3, 5A, 5B, and 5C, however. Here, diffusing section 114A is of the type described in U.S. Pat. No. 7,328,580. As shown in FIG. 6, diffusing section 114A includes a pair of wing troughs 140 increasing in lateral width and depth along common ridge 142, which is inclined with decreasing depth to chevron outlet 116A at outer wall surface 104.

In addition to the reduced flow separation and fill improvements noted above, the incorporation of a shaped metering section modifies the flow structure within the metering section of the cooling passage by generating counter rotating paired vortex structures having the opposite direction of vortex structures observed in single and multi-lobe diffusing sections of cooling passages with conventional cylindrical metering shapes. The counter rotating vortices generated in shaped metering section 112 functionally result in anti-vortices, canceling out the vortices inherently observed in diffusing sections of cooling passages with conventional metering shapes. The combination of the flow structures within metering section 112 and diffusing section 114 of cooling passage 106 results in an ejection of cooling air C that contains minimal or no vorticity and is laminar in nature (i.e. little disruption). The ejection of laminar-like cooling air C reduces or mitigates the amount of turbulent mixing between the high temperature gases flowing along wall 100 and the film coolant flow. The reduced mixing between hot and cold fluids reduces the attenuation rate of the film cooling boundary layer, resulting in significantly increased adiabatic film effectiveness and film cooling performance.

Shaped metering section 112 can reduce the likelihood that cooling air C will diffuse in an upward (with respect to FIG. 4) direction (i.e. forward diffusion). When forward diffusion occurs, some cooling air C does not enter diffusing section 114 and jets or blows off away from outer wall surface 104, resulting in reduced or incomplete formation of the film of cooling air meant to cool outer wall surface 104. Shaped metering section 112 encourages cooling air C to diverge laterally (left and right with respect to FIGS. 5A, 5B, and 5C) within metering section 112 and once it reaches diffusing section 114. The shape of metering section 112 encourages cooling air C to flow into the left and right corners of metering section 112 and also to better attach to the surfaces of diffusing section 114 to prevent "jet off" or "blow off" at high blowing ratios.

The embodiments of cooling passage 106 described herein allow the use of high blowing ratios of cooling air C. As the blowing ratio increases, the pressure gradient across cooling passage 106 increases. When the pressure gradient across cooling passage 106 is increased, cooling air C is forced to fill the extremities (corners, edges, etc.) of metering section 112. By filling the entire metering section 112 with cooling air C, the air flow is less likely to separate one it reaches diffusing section 114 and begins to expand. Thus, metering section 112 improves the filling of diffusing section 114 with cooling air C.

By encouraging lateral diffusion at high blowing ratios, diffusing section 114 is able to provide a better film of cooling air along outer wall surface 104 and cool the gas turbine engine component. Producing a better film of cooling air provides cooling solution flexibility. The number of cooling passages 106 needed to cool the component can be reduced, the temperature of cooling air C used to cool the component can be increased and/or the component can be exposed to higher temperature environments without overheating. The cooling passages described herein will provide improved film cooling at any blowing ratio, but are particularly suited for blowing ratios between about 0.5 and 10 where the blowing ratio (mass flux ratio) is calculated according to the equation:

$$M = \rho_j V_j^1 / \rho_\infty V_\infty$$

Passage walls 128, 128A, 130 and 130A can also include vortex-generating structures such as those described in U.S. patent application Ser. No. 12/157,115. Vortex-generating structures can be used to negate flow vortices that are created elsewhere in cooling hole 106 to prevent the formation of kidney vortices at outlet 116 and the unwanted entrainment of high temperature gas into the cooling air film.

The gas turbine engine components, gas path walls and cooling passages described herein can be manufactured using one or more of a variety of different processes. These techniques can provide each cooling passage with its own particular configuration and features, including, but not limited to, inlet, metering, diffusion, outlet, upstream wall, downstream wall, lateral wall, longitudinal, lobe and downstream edge features, as described herein. In some cases, multiple techniques can be combined to improve overall cooling performance or reproducibility, or to reduce manufacturing costs.

Suitable manufacturing techniques for forming the cooling configurations described herein include, but are not limited to, electrical discharge machining (EDM), laser drilling, laser machining, electrical chemical machining (ECM), water jet machining, casting, conventional machining, additive manufacturing and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding. Additive manufacturing methods include, but are not limited to, robocasting, electron-beam melting, selective laser melting, selective laser sintering, direct metal laser sintering, directed energy deposition and electron beam freeform fabrication.

The gas flow path walls and outer surfaces of some gas turbine engine components can include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling passage location, repair requirements and other considerations, the diffusion portion and outlet features can be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling passage, for example, different EDM, laser machining and other machining techniques may be used for forming the outlet and diffusion features, and for forming the metering and inlet features.

Discussion of Possible Embodiments

The following are non-exclusive descriptions of possible embodiments of the present invention.

A gas turbine engine component with a cooling passage can include a first wall defining an inlet of the cooling passage, a second wall generally opposite the first wall and defining an outlet of the cooling passage, a metering section extending downstream from the inlet and a diffusing section extending from the metering section to the outlet. The metering section can include an upstream side and a downstream side generally opposite the upstream side. At least one of the upstream and downstream sides can include a first passage wall and a second passage wall and the first and second passage walls intersect to form a V-shape.

The component of the preceding paragraph can optionally include, additionally and/or alternatively, any one or more of the following features, configurations and/or additional components.

The first passage wall and the second passage wall can be generally straight.

The first passage wall and the second passage wall can intersect to form an angle that is greater than 90 degrees.

The first passage wall and the second passage wall can be located on the upstream side.

The first passage wall and the second passage wall can be located on the downstream side.

The downstream side can include a third passage wall and a fourth passage wall where the third and fourth passage walls intersect to form a second V-shape.

The first passage wall and the third passage wall can be generally parallel and the second passage wall and the fourth passage wall can be generally parallel.

The first V-shape can have a first angle and the second V-shape can have a second angle where the first angle and the second angle are non-equivalent.

The first and second V-shapes can form a chevron shape having a center and two opposite ends where the chevron shape has a greater height at its center than at either end.

The diffusing section can include multiple lobes.

The diffusing section can further include a ridge located between two of the multiple lobes, the first passage wall and the second passage wall can be located on the downstream side, and the first passage wall and the second passage wall can intersect with each other and the ridge.

The outlet at the second wall can be a chevron outlet and where the diffusing section can include a pair of wing troughs increasing in lateral width and depth along a common ridge being inclined with decreasing depth to the chevron outlet at the second wall.

The component can be selected from the group consisting of blade airfoils, vane airfoils, blade platforms, vane platforms, combustor liners, blade outer air seals, blade shrouds, augmentors and endwalls.

A method of forming the component can include forming the diffusing section by electrical discharge machining first and forming the metering section by electrical discharge machining second.

A method of forming the component can include additively manufacturing the component to define the cooling passage.

A wall located in a gas turbine engine can include first and second surfaces and a cooling passage extending between an inlet at the first surface and an outlet at the second surface. The cooling passage can include a metering section commencing at the inlet and a diffusing section in communication with the metering section and terminating at the outlet. The metering section can include a longitudinal first side and a longitudinal second side generally opposite the first side. The first side can include a first passage wall and a second passage wall and the first and second passage walls intersect to form a vertex.

The wall of the preceding paragraph can optionally include, additionally and/or alternatively, any one or more of the following features, configurations and/or additional components.

The first side can be the upstream side of the cooling passage.

The first side can be the downstream side of the cooling passage.

The second side can include a third passage wall and a fourth passage wall where the third and fourth passage walls can intersect to form a second vertex.

The first vertex can form a first angle and the second vertex can form a second angle where the first angle and the second angle are non-equivalent.

The first and second vertices can form a chevron shape having a center and two opposite ends where the chevron shape has a greater height at its center than at either end.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising a wall, the wall comprising:
   a first surface and a second surface; and
   a cooling passage extending between an inlet at the first surface and an outlet at the second surface, the cooling passage comprising:
      a metering section commencing at the inlet, the metering section comprising:
         a longitudinal first side; and
         a longitudinal second side opposite the longitudinal first side, wherein the longitudinal first side comprises a first passage wall and a second passage wall, and wherein the longitudinal second side comprises a third passage wall and a fourth passage wall;
      a diffusing section in communication with the metering section and terminating at the outlet;
      wherein, viewing the metering section from the diffusion section:
         at least one of the first and second passage walls is straight and the other of the first and second passage walls is at least partially curved, wherein the first and second passage walls intersect to form a vertex;
         the third passage wall is curved, extending from the first passage wall;
         the fourth passage wall is curved, extending from the second passage wall to intersect the third passage wall; and
         the first passage wall and the second passage wall intersect to form an angle at the vertex that is greater than 90 degrees, the angle measured exterior to the metering section.

2. A gas turbine engine comprising a wall, the wall comprising:
   a first surface and a second surface; and
   a cooling passage extending between an inlet at the first surface and an outlet at the second surface, the cooling passage comprising:
      a metering section commencing at the inlet, the metering section comprising:
         a longitudinal first side; and
         a longitudinal second side opposite the longitudinal first side, wherein the longitudinal first side comprises a first passage wall and a second passage wall, and wherein the longitudinal second side comprises a third passage wall and a fourth passage wall;
      a diffusing section in communication with the metering section and terminating at the outlet;
      wherein, viewing the metering section from the diffusion section:
         the first and second passage walls are straight and intersect to form a vertex;
         the third passage wall is curved, extending from the first passage wall;
         the fourth passage wall is curved, extending from the second passage wall to intersect the third passage wall; and
         the first passage wall and the second passage wall intersect to form an angle at the vertex that is greater than 90 degrees, the angle measured exterior to the metering section.

3. The gas turbine engine of claim 2, wherein the diffusing section comprises multiple lobes.

4. The gas turbine engine of claim 3, wherein the diffusing section comprises a ridge located between two lobes of the multiple lobes.

5. The gas turbine engine of claim 2, wherein the diffusion section comprises a pair of wing troughs that increase in lateral width and depth along a ridge.

6. The gas turbine engine of claim 3, wherein the diffusing section comprises multiple lobes and a ridge located between two lobes of the multiple lobes, and wherein the ridge intersects the first and second passage walls at the vertex.

7. The gas turbine engine of claim 6, wherein the ridge bisects the diffusion section.

8. The gas turbine engine of claim 2, wherein the diffusion section comprises at least three lobes.

9. The gas turbine engine of claim 2, wherein the vertex is disposed at a lateral center of the metering section.

10. The gas turbine engine of claim 2, wherein the metering section includes a hydraulic diameter and a length, and wherein the length is greater than or equal to the hydraulic diameter and less than or equal to three times the hydraulic diameter.

\* \* \* \* \*